United States Patent [19]

Nordlund

[11] Patent Number: 4,716,399
[45] Date of Patent: Dec. 29, 1987

[54] OPTOMECHANICAL CONTROL APPARATUS

[75] Inventor: Lester H. Nordlund, Federal Way, Wash.

[73] Assignee: The Boeing Company, Seattle, Wash.

[21] Appl. No.: 691,167

[22] Filed: Jan. 14, 1985

[51] Int. Cl.⁴ .................................. G08C 9/00
[52] U.S. Cl. ........................ 340/365 P; 340/365 R; 74/471 XY; 250/221
[58] Field of Search ............... 340/365 P, 365 R, 712; 200/6 A; 74/471 XY, 479; 244/234, 236; 250/221, 211 K; 273/148 B; 318/564, 628

[56] References Cited

U.S. PATENT DOCUMENTS

| Re. 24,701 | 9/1959 | Redmond | 164/245 |
|---|---|---|---|
| 2,445,550 | 7/1948 | Wotton | 416/102 |
| 2,885,163 | 5/1959 | De Haven | 244/236 |
| 3,104,388 | 9/1963 | Balenger | 340/345 |
| 3,270,260 | 8/1966 | Mehr | 361/300 |
| 3,582,752 | 6/1971 | Steinberg | 318/696 |
| 3,726,497 | 4/1973 | Gannett et al. | 244/234 |
| 3,729,129 | 4/1973 | Fletcher et al. | 377/17 |
| 3,744,335 | 7/1973 | Karisson et al. | 74/471 XY |
| 3,881,106 | 4/1975 | Pocker et al. | 250/211 K |
| 3,935,916 | 2/1976 | Ferraro | 74/479 |
| 3,964,336 | 6/1976 | Harmening | 74/501 M |
| 4,134,560 | 1/1979 | Messerschmidt | 74/471 XY |
| 4,148,014 | 4/1979 | Burson | 340/709 |
| 4,156,130 | 5/1979 | Ivashin et al. | 377/17 |
| 4,161,726 | 7/1979 | Burson et al. | 340/365 R |
| 4,384,203 | 5/1983 | Wells | 250/227 |
| 4,389,151 | 6/1983 | Brown | 74/471 XY |
| 4,510,574 | 4/1985 | Guittet et al. | 318/628 |
| 4,533,827 | 8/1985 | Fincher | 250/221 |

FOREIGN PATENT DOCUMENTS 1179322 5/1959 France .

OTHER PUBLICATIONS

M. W. Carmichael–Coded Sphere Joystick–IBM Technical Disclosure Bulletin–vol. 19, No. 6, Nov. 1976, pp. 2226–2227.

"Tech Brief, Miniature Two-Axis Joystick Controller", R. Hollow, NASA Techs Briefs, Fall 1982, pp. 1–8.

*Primary Examiner*—John W. Caldwell, Sr.
*Assistant Examiner*—Mahmoud Fatahi-yar
*Attorney, Agent, or Firm*—Christensen, O'Connor, Johnson & Kindness

[57] ABSTRACT

A control apparatus for use in a fly-by-wire flight control system. The apparatus comprises a support structure, a tube (22) mounted to the support structure for rotation about the tube lengthwise axis, at least two joysticks (18, 20) mounted to the tube, a coupling bar (24) and sensors (14, 16). Each joystick has a first end (30) adapted for gripping by an operator, a second end pivotally connected to the coupling member, and an intermediate portion (64) pivotally mounted to the tube such that the joystick is rotatable about a transverse axis (40) fixed in the tube and perpendicular to the lengthwise axis, the transverse axes of the joysticks being parallel to one another. The sensors include a two axis photodetector (44) and light emitting diodes (46) for directing a beam of radiation to a point on the photodetector. The sensor is adapted to vary the position of the point along a first axis of the photodetector as the joysticks are rotated about the lengthwise axis, and to vary the position of the point along a second axis of the photodetector as the joysticks are rotated about the transverse axes.

13 Claims, 7 Drawing Figures

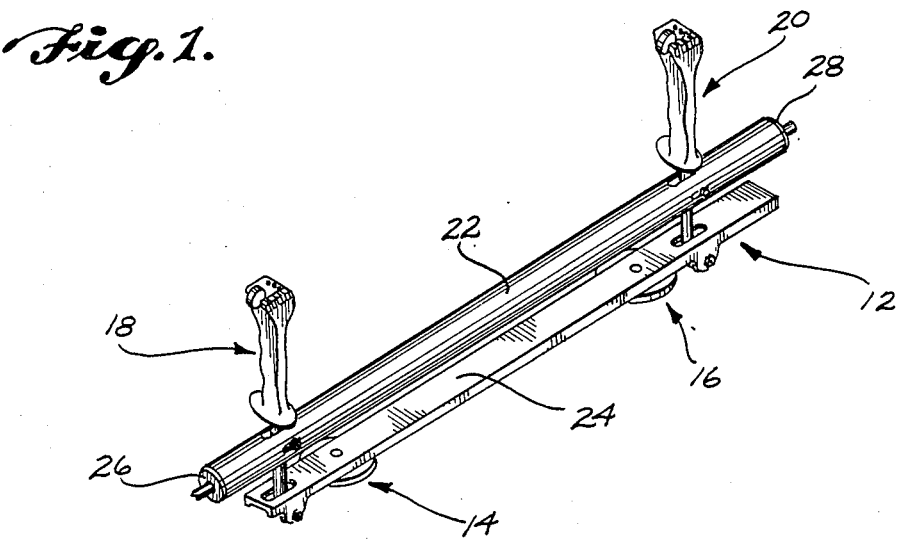
Fig. 1.
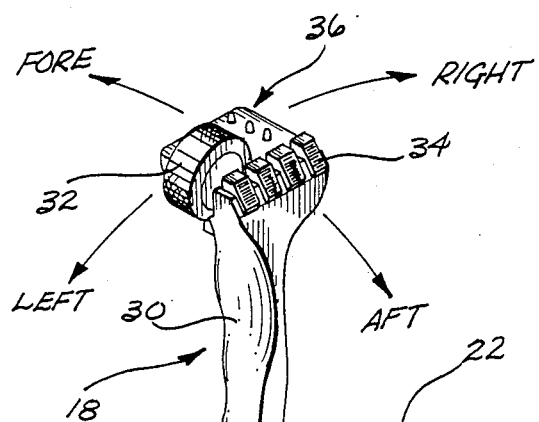
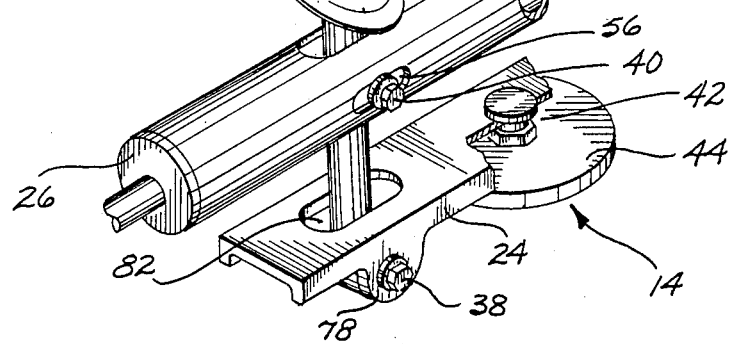
Fig. 2.

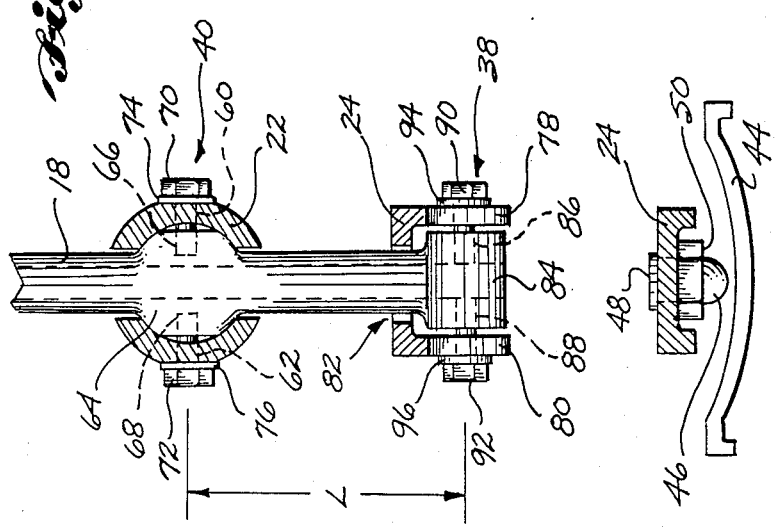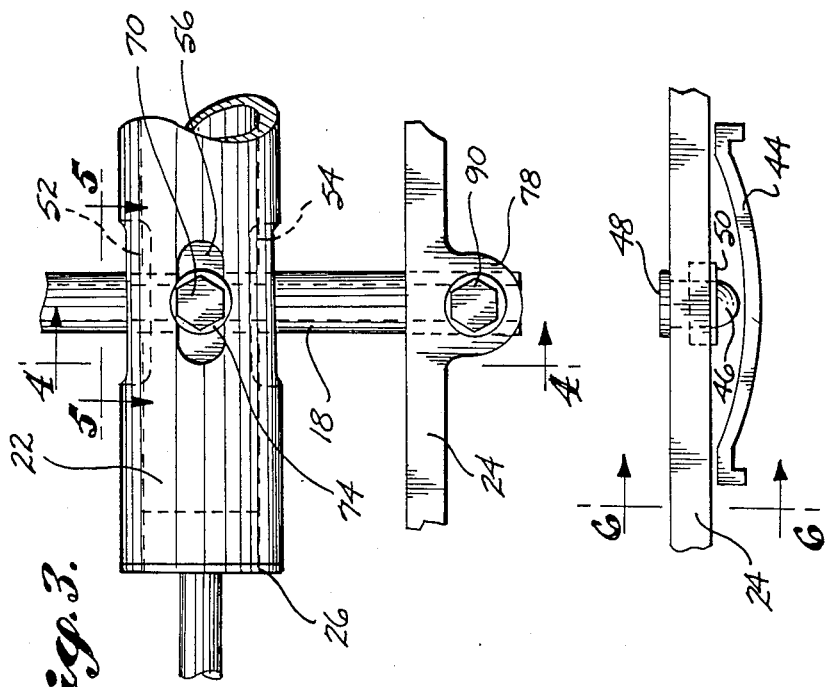

OPTOMECHANICAL CONTROL APPARATUS

FIELD OF THE INVENTION

The present invention relates to joystick control assemblies and, in particular, to a control assembly comprising multiple joysticks and optomechanical means for translating joystick orientation into electrical signals.

BACKGROUND OF THE INVENTION

The use of joysticks in aircraft flight control systems is well known. In a typical two-axis joystick system, motion of the joystick in the fore-and-aft direction controls the aircraft pitch, and motion of the joystick in the left-right direction controls the aircraft roll. In a related system using a control wheel instead of a joystick, fore-and-aft motion of the control wheel controls pitch, and rotation of the control wheel about its axis controls roll. Using either system, the joystick or control wheel is mechanically coupled by means of cables to the various attitude control subsystems, e.g., to mechanical/hydraulic subsystems for controlling aileron position. In a commercial airliner, safety considerations require two or more separate sets of flight controls, e.g., separate control wheels or joysticks for the pilot and the copilot. In prior flight control systems for commercial aircraft, cables and/or gears have been used to mechanically couple the pilot and copilot flight controls to each other as well as to the various attitude control subsystems.

In modern fly-by-wire flight control systems, the hand movements of the pilot and copilot are first translated into electrical signals by electromechanical transducers, and the electrical signals are in turn used to control the various flight surfaces. In general, one transducer is required for each joystick axis. In a fly-by-wire system, the pilot and copilot flight controls may be either mechanically coupled to one another, or may comprise separate, parallel installations. The use of separate, parallel flight controls for the pilot and copilot presents significant design problems in terms of resolving conflicting signals. Separate, mechanically coupled flight controls can in principle avoid may of such problems. However, prior mechanically coupled systems have been extremely complex and heavy, and have also required separate transducers for each axis and complex interfaces to feel, autopilot and trim systems.

SUMMARY OF THE INVENTION

The present invention provides a control apparatus for multiple joystick, fly-by-wire flight control systems. The control apparatus of the present invention includes joysticks that are mechanically coupled to one another, thereby precluding the generation of conflicting control commands. However, the system is adapted such that electrical or fiber optic control systems can be made fully redundant and isolated from one another, thereby enhancing the safety of the system. The nonredundant system components consist solely of extremely simple and essentially failure proof mechanical components linking the joysticks to one another. The control apparatus of the present invention is also well adapted to use with a data bus architecture for providing communication between different aircraft subsystems.

The control apparatus of the present invention comprises a support structure, a joystick assembly mounted to the support structure, and sensor means. The joystick assembly includes at least two joysticks, and mounting means for mounting the joysticks such that the joysticks can rotate in unison about common first and second directions. The mounting means includes a coupling member adapted such that rotation of the joysticks about the first direction causes a characteristic first movement of the coupling member, and such that rotation of the joysticks about the second direction causes a second characteristic movement of the coupling member. The sensor means includes a two-axis photodetector and illumination means for directing a beam of radiation to a point on the photodetector. The sensor means is adapted to vary the position of the point along a first axis of the photodetector as the coupling member undergoes its first characteristic movement, and to vary the position of the point along a second axis of the photodetector as the coupling member undergoes its second characteristic movement.

In one preferred embodiment, the joystick assembly comprises a tube mounted to the support structure for rotation about the tube's lengthwise axis. In this embodiment, an intermediate portion of each joystick is pivotally mounted to the tube such that the joystick is rotatable about a transverse axis fixed in the tube and perpendicular to the lengthwise axis. The transverse axes of the joysticks are all parallel to one another, such that the first direction of joystick rotation is defined by the lengthwise axis and the second direction of joystick rotation is defined by the transverse axes. Each joystick includes a first end adapted for gripping by an operator and a second end pivotally connected to the coupling member. The first characteristic movement of the coupling member, corresponding to joystick rotation about the first direction, is movement of the coupling member about the lengthwise axis. The second characteristic movement of the coupling member, corresponding to joystick rotation about the second direction, comprises movement of the coupling member along the lengthwise axis.

BRIEF DESCRIPTION OF THE DRAWINGS

FIG. 1 is a perspective view of one preferred embodiment of the control apparatus of the present invention;

FIG. 2 is an enlarged perspective view of a portion of the control apparatus of FIG. 1;

FIG. 3 is a side elevational view of a portion of the control apparatus of FIG. 2;

FIG. 4 is a cross-sectional view taken along the line 4—4 of FIG. 3;

FIG. 6 is a side elevational view of one sensor; and,

FIG. 7 is a cross-sectional view taken along the line 6—6 of FIG. 5.

DETAILED DESCRIPTION OF THE INVENTION

Figure 5:
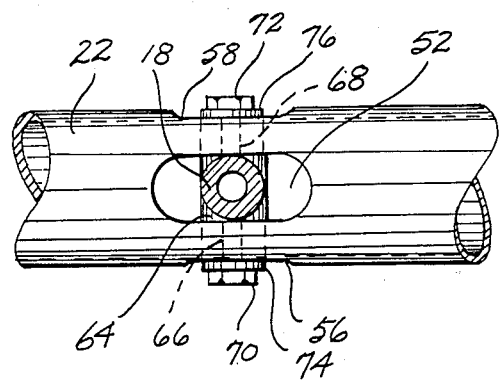
FIG. 5 is a cross-sectional view taken along the line 5—5 of FIG. 3.

FIG. 1 illustrates one preferred embodiment of a control apparatus according to the present invention. The control apparatus comprises joystick assembly 12 and identical sensors 14 and 16. Joystick assembly 12 comprises joysticks 18 and 20, torque tube 22 and coupling bar 24. Torque tube 22 comprises an elongated, hollow cylinder mounted at its ends by bearings 26 and 28 respectively, such that the torque tube is rotatable about its lengthwise axis or centerline. Bearings 26 and 28 are in turn mounted to a suitable support structure. In a typical aircraft installation, the lengthwise axis of torque tube 22 would be mounted laterally with respect to the aircraft.

Referring now to FIG. 2, joystick 18 comprises an elongated, hollow member pivotally mounted to torque tube 22. The upper end of joystick 18 includes handle 30 that comprises conventional control and indicator components such as trim adjustment thumb wheel 32, switches 34 and indicator lights 36. The handle controls and indicators are electrically connected to other aircraft systems by wires that pass through the hollow shaft of the joystick. The lower end of joystick 18 is pivotally connected to coupling bar 24 at pivot 38. An intermediate portion of joystick 18 is pivotally connected to torque tube 22 at pivot 40, the axis of pivot 40 being parallel to the axis of pivot 38, and the axes of pivots 38 and 40 both being perpendicular to the lengthwise axis of torque tube 22. The construction and mounting joystick 20 is identical to that of joystick 18. Joystick assembly 12 can include any number of additional joysticks similar to joysticks 18 and 20.

Joysticks 18 and 20 suspend coupling bar 24 beneath torque tube 22, such that the lengthwise axis of the coupling bar is parallel to the lengthwise axis of the torque tube. As a result of these connections, joystick 18 can be rotated by an operator in two, mutually perpendicular directions about a point defined by the intersection of the lengthwise axis of torque tube 22 and the axis of pivot 40. In the first of these directions, defined by the arrows labeled Fore and Aft in FIG. 2, torque tube 22 rotates about its fixed, lengthwise axis, and the inclination of the joystick with respect to the torque tube remains constant. Fore and Aft joystick movement controls the aircraft pitch, a Fore movement corresponding to nose down and an Aft movement corresponding to nose up. Because pivot 40 and the corresponding pivots for other joysticks are fixed with respect to the torque tube, all Fore and Aft movements of one joystick are transmitted through a short and stiff mechanical coupling to all other joysticks, resulting in parallel Fore and Aft movement of all joysticks.

The second direction for joystick movement is indicated by the arrows labeled Left and Right in FIG. 2. In this movement torque tube 22 does not rotate, but the angle of the joystick with respect to the torque tube changes as the joystick rotates about pivot 40. Left and Right joystick movement controls the aircraft roll, a Left movement corresponding to an aircraft roll to the left (counterclockwise) and a Right movement corresponding to aircraft roll to the right (clockwise). Because the lower ends of the joysticks are connected through coupling bar 24, all Left and Right movement of one joystick is transmitted through a short and stiff mechanical coupling to all other joysticks, resulting in parallel Left and Right movement of all joysticks. During Left and Right movement of joystick 18, the joystick rotates about an axis, i.e., pivot 40, that itself rotates about the torque tube centerline during Fore and Aft joystick movement. In one preferred embodiment, joystick 18 can be rotated through an angle of about 25° in each direction from its center position indicated in FIG. 2. Rotation in the Fore and Aft directions may be limited by stops (not shown). Movement in the Left and Right directions is limited by interference between the joysticks and the torque tube and coupling bar, as described below.

Referring now to FIGS. 1 and 2, it can be seen that as the joystick is rotated in the Fore and Aft directions, coupling bar 24 undergoes a first movement that consists of rotation of the coupling bar about the lengthwise axis of torque tube 22. On the other hand, when the joystick is rotated in the Left or Right directions, pivot 38 rotates about pivot 40, and coupling bar 24 undergoes a second movement that consists primarily of lengthwise motion and, to a lesser extent, translational movement towards or away from torque tube 22. An actual movement of joystick 18 or 20 may in general result in both types of movement on the part of the coupling bar. For both types of joystick rotation, the parallel orientation of the coupling bar with respect to the lengthwise torque tube axis is maintained.

Sensor 14 comprises LED assembly 42 mounted to the coupling bar and two axis photodetector arrays 44 positioned beneath the coupling bar and LED assembly. As illustrated in FIGS. 6 and 7, LED assembly 42 comprises LED 46, LED mount 48 and lock nut 50. LED mount 48 extends through an opening in coupling bar 24 and is fastened in position by the lock nut. LED 46 is mounted to LED mount 48, and is positioned such that it is spaced closely above photodetector array 44 and such that light emitted by the LED is directed downward in a narrow collimated beam onto the photodetector array. The output signals from the photodetector array may be processed by conventional detection, normalization and scaling circuitry into signals that represent the orientation of joysticks 18 and 20. Sensor 16 is identical to sensor 14, and may be included to provide redundancy to the system in case of failure of one of the sensors. Each sensor may include a dust cover (not shown) for excluding dust from the surface of the photodetector array.

FIGS. 3-5 illustrate in greater detail the connection between joystick 18, torque tube 22 and mounting bar 24. Torque tube 22 has a hollow tubular shape, and includes oval openings 52 and 54 in its upper and lower surfaces respectively. The Fore and Aft surfaces of torque tube 22 include flattened areas 56 and 58 and openings 60 and 62 centrally positioned with respect to flattened areas 56 and 58 respectively. Joystick 18 includes an enlarged central section 64 that is positioned within torque tube 22. Central section 64 includes oppositely spaced, internally threaded openings 66 and 68 that are adapted to receive pivot bolts 70 and 72 respectively. Pivot bolts 70 and 72 are threaded within openings 66 and 68 respectively and thereby rigidly secured to joystick 18. Bearing washers 74 and 76 are respectively positioned between the heads of pivot bolts 70 and 72 and flattened areas 56 and 58 of torque tube 22. The bearing washers permit rotation of the joystick and pivot bolts with respect to the torque tube. As best illustrated in FIG. 5, central section 64 of joystick 18 is shaped such that when the joystick is rotated 90° with respect to the torque tube, central section 64 can pass through opening 52 in the upper surface of the torque tube. The joystick assembly can therefore be assembled by inserting the joystick downward into the torque tube until central section 64 is positioned within the torque tube bore, rotating the joystick 90°, and then inserting pivot bolts 70 and 72 and bearing washers 74 and 76. Openings 52 and 54 therefore serve two purposes—they permit assembly of the joystick, and they provide for a range of Left and Right movement of the joystick as illustrated in FIG. 2. Openings 52 and 54 are preferably sized such that the joystick contacts the cylindrical outer shell of the torque tube only at the limits of joystick travel in the Left and Right directions.

Referring now to FIGS. 2-4, coupling bar 24 includes a pair of spaced-apart depending flanges 78 and 80 between which the lower end of joystick 18 is mounted. The joystick extends through oval opening 82 in coupling bar 24, opening 82 being similar in size to openings 52 and 54 in torque tube 22. The lower end of joystick 18 includes enlarged section 84 that includes oppositely spaced, internally threaded openings 86 and 88. Enlarged section 84 is identical or similar in cross section to central section 64. Enlarged section 84 can therefore be passed through openings 52, 54 and 86 in torque tube 22 during assembly of the joystick. Opening 86 and 88 are adapted to receive pivot bolts 90 and 92 respectively, the pivot bolts being threaded into the openings such that the pivot bolts are rigidly secured to the joystick. Bearing washers 94 and 96 are respectively positioned between heads of pivot bolts 90 and 92 and flanges 78 and 80 of coupling bar 24. The bearing washers permit rotation of the joystick and pivot bolts with respect to the coupling bar.

Referring now to FIGS. 2 and 6, it can be seen that as joystick 18 is moved in the Left and Right directions, coupling bar 24 will undergo its second movement, described above, that consists primarily of lengthwise motion and, to a lesser extent, translational movement towards and away from the torque tube. The upper surface of photodetector array 44 is preferably shaped to match the resulting trajactory of LED 46, such that the LED at all times is spaced a short distance above the upper surface of the photodetector array. Referring now to FIGS. 2 and 7, it can be seen that movement of the joystick in the Fore and Aft directions results in the first movement of the coupling bar in which the coupling bar rotates about the axis of the torque tube. During the first movement, LED 46 rotates about a point defined by the intersection of the lengthwise torque tube axis and the joystick centerline. As illustrated in FIG. 7, the upper surface of photodetector array in this dimension is preferably shaped to match the circular trajectory of the LED during this first movement of the coupling bar.

The distance L between pivots 38 and 40 (FIG. 4) is directly related to the desired resolution of the system and to the size of the photodetector arrays. The dimension L, together with the maximum roll angle $\theta_1$ and the maximum pitch angle $\theta_2$ combine to define the light sensitive spherical surface area of the photodetector array. The area A may be determined by the relationship:

$$A = \frac{4 L^2 \theta_1 \theta_2}{129600} \quad (1)$$

where L is in inches, $\theta_1$ and $\theta_2$ are in degrees, and A is in square inches. Therefore for a system in which L is equal to 2.4 inches and in which the joysticks can travel 25° in either of four directions from their center positions, the required surface area for the photodetector array will be approximately 1.4 square inches.

In the embodiments illustrated in FIGS. 1 and 2, the angle of the light beam produced by LED assembly 42 changes when the pitch is varied by moving the joystick in the Fore or Aft directions, whereas roll movements (Left and Right) have no effect on the light beam angle. By relocating the LED assembly and/or adding mechanical linkages, both pitch and roll movements of the joystick could be made to affect the light beam equally. For example, the LEDs assembly could be mounted at the base of each joystick. However, the sensor adjustments would then have additional channels to channel tolerances caused by the linkage between channels. A better approach for most systems is to provide appropriate compensation in the pitch/roll amplifier gain circuits to compensate for light beam angle differences during pitch and roll. Such compensation could also be provided in connection with the use of a photodetector array having a flat light sensitive surface.

Referring to FIG. 1, the illustrated control apparatus may also include feel, autopilot and trim control assemblies (not shown) coupled to the torque tube and coupling bar in a manner identical to the connection between each joystick and the torque tube and coupling bar. A feel assembly provides resistance to joystick movement so that the joystick has an appropriate feel to the pilot or copilot. An autopilot assembly would include means to couple the autopilot commands to the control apparatus, such that the joysticks move in a manner consistent with the control surfaces controlled by the autopilot.

While the preferred embodiments of the invention have been illustrated and described, it should be understood that variations will be apparent to those skilled in the art. Accordingly, the invention is not to be limited to the specific embodiment illustrated and described, and the true scope and spirit of the invention are to be determined by reference to the following claims.

The embodiments of the invention in which an exclusive property or privilege is claimed are defined as follows:

1. A control apparatus, comprising:
   A support structure;
   a joystick assembly mounted to the supported structure, the joystick assembly including at least two joysticks, and mounting means for mounting the joysticks such that the joysticks can rotate in unison about common first and second axes that are not parallel to one another, the mounting means including a coupling member coupled to the joysticks such that rotation of the joysticks about the first axis causes a first characteristic movement of the coupling member, and rotation of the joysticks about the second axis causes a second characteristic movement of the coupling member; and
   position measuring means, including a two-axis photodetector and illumination means for directing a beam of radiation to a point on the photodetector, the position measuring means cooperating with the coupling member to vary the position of the point along a first axis of the photodetector as the coupling member undergoes its first characteristic movement and to vary the position of the point along a second axis of the photodetector as the coupling member undergoes its second characteristic movement.

2. The control apparatus of claim 1, wherein the joystick assembly comprises a cross support mounted to the support structure, the cross support having a lengthwise axis and being mounted to the support structure for rotation about the lengthwise axis, and wherein the joystick assembly further comprises transverse mounting means associated with each joystick, each transverse mounting means being operative to pivotally mount its associated joystick for rotation about a transverse axis fixed in the cross support and perpendicular to the lengthwise axis, the transverse axes of the joysticks being parallel to one another, such that the first axis is defined by the lengthwise axis and the second axis is defined by the transverse axes.

3. The control apparatus of claim 2, wherein each joystick comprises an elongated member having a first end adapted for gripping by an operator, a second end pivotally connected to the coupling member and an intermediate portion pivotally mounted to the cross support by the associated transverse mounting means, and the first characteristic movement of the coupling member, corresponding to joystick rotation about the first axis, is rotation of the coupling member about the lengthwise axis, and the second characteristic movement of the coupling member, corresponding to joystick rotation about the second axis, includes movement of the coupling member along the lengthwise axis.

4. The control apparatus of claim 3, wherein the distance from the second end of each joystick to the cross support is the same for each joystick, and wherein the coupling member comprises a coupling arm oriented parallel to the lengthwise axis.

5. The control apparatus of claim 4, wherein the illumination means comprises a source of radiation mounted to the coupling arm.

6. The control apparatus of claim 5, wherein the source of radiation directs the beam of radiation in a generally downward direction, and wherein the photodetector is positioned below the source of radiation.

7. The control apparatus of claim 6, wherein the source of radiation comprises a light emitting diode.

8. The control apparatus of claim 3, wherein the cross support includes upper and lower openings associated with each joystick through which the joystick passes, and wherein the intermediate portion of each joystick includes a section enlarged along the transverse axis and connected to the associated transverse mounting means, said section being dimensioned such that it can pass through the upper and lower openings only when the joystick is rotated 90° about its elongated dimension with respect to its position in the assembled joystick assembly.

9. The control apparatus of claim 8, wherein the upper and lower openings operate to limit the rotation of the joystick about the second direction.

10. A control apparatus comprising:

a support structure;
a cross support having a lengthwise axis and being mounted to the support structure for rotation about the lengthwise axis;
at least two joysticks mounted to the cross support, each joystick comprising an elongated member having a first end adapted for gripping by an operator, a second end, and an intermediate portion pivotally mounted to the cross support such that the joystick is rotatable about a transverse axis fixed in the cross suport and perpendicular to the lengthwise axis, the transverse axes of the joysticks being parallel to one another;
a coupling member pivotally mounted to the second end of each joystick for rotation about an axis parallel to said transverse axes, whereby the joysticks can rotate in unison about the transverse axes and about the lengthwise axis; and,
position measuring means, including a two-axis photodetector and illumination means for directing a beam of radiation to a point on the photodetector, the position measuring means cooperating with the coupling member to vary the position of the point along a first axis of the photodetector as the joysticks are rotated about the lengthwise axis, and to vary the position of the point along a second axis of the photodetector as the joysticks are rotated about the transverse axes.

11. The control apparatus of claim 1, wherein the position measuring means comprises a first portion connected to the coupling member for movement therewith and a second portion connected to the support structure, and
the mounting means includes means for causing the first portion to move about a fixed point and describe a portion of a spherical surface as the joysticks are rotated about the first and second axes.

12. The control apparatus of claim 11, wherein the first portion of the sensing means comprises the illumination means, and the second portion of the sensing means comprises the photodetector.

13. The control apparatus of claim 11, wherein said photodetector comprises a photosensitive surface having a spherical shape concentric with the fixed point.

* * * * *